UNITED STATES PATENT OFFICE.

CLYDE E. WILLIAMS, OF NIAGARA FALLS, NEW YORK, ASSIGNOR TO HOOKER ELECTROCHEMICAL COMPANY, OF NEW YORK, N. Y., A CORPORATION OF NEW YORK.

METHOD OF PREPARING AQUEOUS SOLUTIONS OF ANTIMONY TRICHLORIDE.

1,425,565.     Specification of Letters Patent.     Patented Aug. 15, 1922.

No Drawing.     Application filed August 10, 1920. Serial No. 402,650.

*To all whom it may concern:*

Be it known that I, CLYDE E. WILLIAMS, a citizen of the United States, residing at Niagara Falls, in the county of Niagara and State of New York, have invented certain new and useful Improvements in Methods of Preparing Aqueous Solutions of Antimony Trichloride, of which the following is a specification.

This invention is a novel method for the preparation of antimony trichloride in aqueous solution, by direct reaction of free chlorin upon antimony metal in presence of hydrochloric acid, the latter in sufficient concentration to prevent substantial separation of oxychlorid compounds by hydrolysis.

It is of course well known that chlorin will react strongly with metallic antimony either in presence or absence of water; but it has not heretofore been found practicable, so far as I am aware, to utilize this reaction for the commercial manufacture of aqueous solutions of antimony trichloride.

Following is a preferred example of the method according to the present invention, it being understood that the invention is not restricted to the precise operating conditions described in said example.

Metallic antimony, conveniently in the form of $\frac{1}{32}''$ to $\frac{1}{4}''$ fragments, is charged into an upright cylindrical earthenware vessel or reactor, and is completely submerged under a solution of hydrochloric acid, preferably of 15°–15.5° Bé, although some variation in this concentration is permissible. Preferably the charge of metal should be sufficient to fill the vessel to approximately one-half of its depth or somewhat less; and the lower half of the vessel at least should be water-cooled, for example by standing one or several of these reactors in a tank or trough of running water. The acid may fill the reactor nearly to the top. The chlorin gas, preferably diluted to approximately 50% concentration by air, is introduced into the bottom of the reactor beneath the bed of metal, the flow of gas being regulated to maintain the temperature of the solution above normal but below about 60° C. An operating temperature approximating 60° C. is preferred. The air in the gas mixture serves both to moderate the reaction and to stir the contents of the reactor; it should be so adjusted as to avoid substantial losses of hydrochloric acid at the operating temperature and concentration.

Chlorination is continued under these conditions until a solution of approximately 45–50° Bé. is obtained. The flow of chlorin is then stopped and the bulk of the liquor drained off from the residual metal, a sufficient amount being left to initiate the succeeding reaction cycle. Additional metal and acid are then added to restore the original proportions, and the operation is repeated.

Although as stated above my invention is not limited to these specific operating conditions, too wide a departure from them will entail certain operating difficulties. For example, if substantially weaker acid be used, the reaction is slower and there is a tendency to the separation of antimony oxychlorid; while if substantially stronger acid be used, the reaction becomes increasingly difficult to control and the losses of hydrochloric acid are greater. Similarly, as to the concentration of the final solution, if this be permitted to exceed about 50° Bé. the reaction becomes difficult of control and leads to considerable losses both of hydrochloric acid and antimony trichloride, the absorption of chlorin becoming also imperfect: with substantially weaker final solutions, it becomes increasingly difficult to start the succeeding reaction, the residual antimony trichloride greatly facilitating this operation.

I claim:—

1. Method of preparing aqueous solutions of antimony trichloride, comprising reacting with chlorin upon antimony metal in presence of hydrochloric acid at sufficient concentration to prevent separation of oxychlorid.

2. Method of preparing aqueous solutions of antimony trichloride, comprising reacting with chlorin upon antimony metal submerged under hydrochloric acid having a concentration of about 15° Bé.; maintaining the reacting temperature below about 60° C.; and stopping the reaction when a concentration of about 45–50° Bé. is obtained.

3. Process according to claim 1 wherein the antimony metal is submerged under the hydrochloric acid, and a portion of the ultimate solution is diluted with hydrochloric acid to initiate the succeeding reaction cycle.

In testimony whereof, I affix my signature.

CLYDE E. WILLIAMS.